H. WHITE. 2 Sheets—Sheet 1.

Assignor of two-thirds Interest to C. H. FARGO & Co.

Shoe-Tip.

No. 8,263. Reissued May 28, 1878.

WITNESSES:

Forde R. Smith

Adelbert Hamilton.

INVENTOR:

Hugh White by Munday & Evarts

Attys.

N. PETERS, PHOTO-LITHOGRAPHER, WASHINGTON, D. C.

H. WHITE.

Assignor of two-thirds Interest to C. H. FARGO & Co.

Shoe-Tip.

No. 8,263. Reissued May 28, 1878.

WITNESSES:

Forde R. Smith

Adelbert Hamilton

INVENTOR:

Hugh White by Munday & Evarts

Attys

N. PETERS, PHOTO-LITHOGRAPHER, WASHINGTON, D. C.

UNITED STATES PATENT OFFICE.

HUGH WHITE, OF CHICAGO, ILLINOIS, ASSIGNOR, BY MESNE ASSIGNMENTS, OF TWO-THIRDS INTEREST TO C. H. FARGO & CO.

IMPROVEMENT IN SHOE-TIPS.

Specification forming part of Letters Patent No. 159,991, dated February 16, 1875; Reissue No. 8,263, dated May 28, 1878; application filed February 1, 1878.

*To all whom it may concern:*

Be it known that I, HUGH WHITE, of Chicago, in the county of Cook and State of Illinois, have invented a new and useful Improvement in Shoe-Tips; and I do hereby declare that the following is a full, clear, and exact description of the construction and operation of the same, reference being had to the annexed drawings, making a part of this specification, and to the letters and figures of reference marked thereon.

Figures 1, 2:
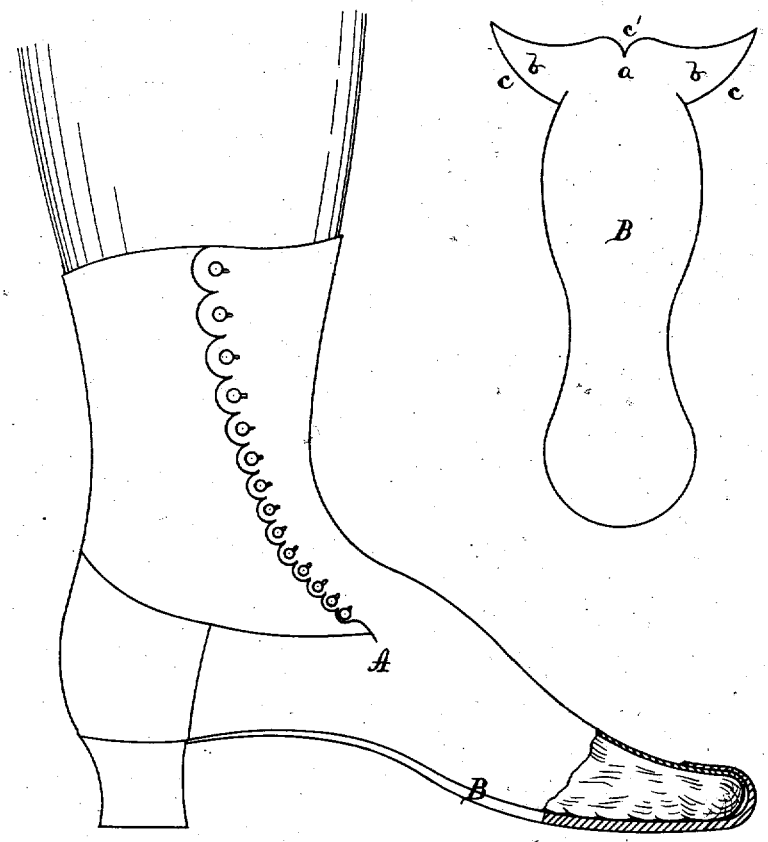
Figure 3:
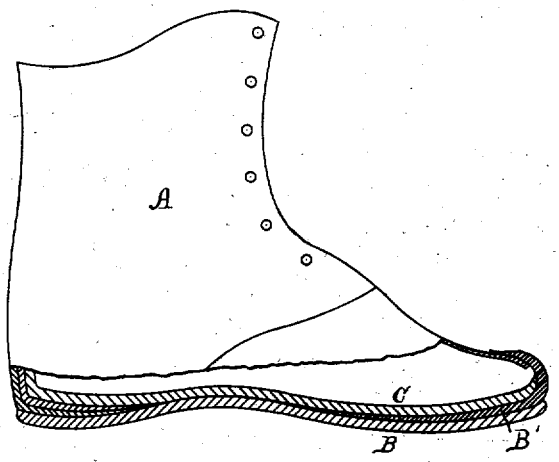
Figure 4:
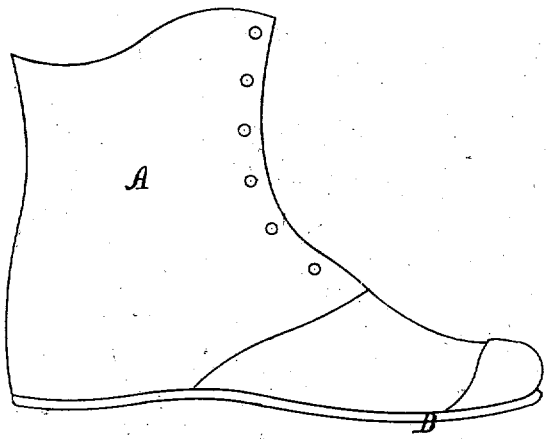

Figure 1 of the drawings is a representation of a side view of my shoe-tip. Fig. 2 is a detail view. Fig. 3 is a sectional view, and Fig. 4 is a detail view of the same.

This invention has relation to the manufacture of that class of boots and shoes wherein a tip is stitched to the toe thereof for the purpose of protecting the upper-leather from undue wear; and the nature of the invention consists in a tip formed by bending over a prolongation of the sole of a boot and shoe, the tip thus formed being properly secured, as to its side edges, to the sole of the shoe or boot, and as to its front edge to the upper-leather thereof, thus doing away with the seam at the front edge of the boot or shoe and greatly lessening the cost thereof, as will be hereinafter more fully explained.

The invention also embraces other features of novelty, which will be understood from what follows and from the drawings.

In the annexed drawings, A designates a boot or shoe, the sole B of which is provided with a prolongation, *a*, with wings *b* of angular form, as shown in Fig. 2.

The sole B, its prolongation *a*, and wings *b* are all formed of one piece of leather, (shown in Fig. 2,) and may be stricken out in a blank by a single descent of a die, and the front edge may be provided with a scallop or scallops, and may have its edges thinned for the purpose of allowing it to be more conveniently turned under and sewed to the sole. In this manner, when the shoe is completed, the curved edges *c* of the prolongation of the sole are sewed firmly thereto, the front edge *c'* being secured to the upper-leather, as shown in Fig. 1, and a seam across the toe is dispensed with. Thus the danger of tearing the sole away from the upper-leather is obviated, while at the same time a strong serviceable tip is secured.

Figure 5:
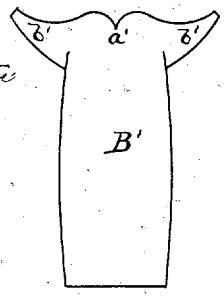

Instead of utilizing the sole to form the tip, I may use a separate piece of sole-leather, B', having a prolongation, *a'*, and wings *b'*, (shown in Fig. 5,) which is rigidly secured between the insole C and the sole B, as shown in Fig. 3, the front edge of which is bent over and back, and is then rigidly secured to the upper-leather of the shoe.

The tip is made thinner at its edges, so that it shall be adapted to be stitched to the upper and not present to the eye an unsightly or undesirable thickness, and at the same time leaves the full thickness of the leather at the toe, where it is required. In this way a stiff strong tip is provided, greatly protecting the toe of the wearer in stumbling, and saving the thin upper-leather from undue wear.

It will be seen that, by the use of a prolongation of the sole to form the tip, I have greatly simplified the details of construction of the said parts, enabling me to dispense with a seam across the toe of the sole of a boot or shoe, and obviating all danger of tearing the sole from the upper under the strain of an accidental violent stumbling of the wearer.

I am well aware that a tip, a sole, and a heel formed in one piece of gutta-percha or india-rubber are not new. I am also aware that toe and heel boxings of sole-leather formed up and crimped in dies have heretofore been made. Hence I do not claim such invention broadly.

I am also aware that shoes have been made with two guards or tips of copper, and perhaps, also, of stiff leather, which, however, not being fastened to the upper, permitted the accumulation of dirt and dust between the tip and the upper, and were open to other objections. I am further aware that it has long been customary to cap or tip shoes with a foxing of soft or upper leather sewed to the upper, which, however, does not afford the desired protection or stiffening to the shoe at this point. I am also aware that it has been usual to put stiff-leather forms or boxes inside the upper at the toe, which afford no protection to the wear of the upper. I do not claim any of these as my invention; but

What I claim is—

1. The leather blank having tip, forming prolongations *a* and wings *b* in one piece therewith, substantially as and for the purpose specified.

2. A sole-leather tip or toe protector, substantially as described, having its thickest portion at the toe and made thin at its edges to adapt it to be stitched to the upper, as shown and set forth.

3. A boot or shoe provided with a sole-leather tip or toe-protector, substantially as described, having its thickest portion at the toe and made thin at the edge, and adapted to be stitched at its margin to the upper-leather.

HUGH WHITE.

Witnesses:
S. M. FARGO,
EDW. S. EVARTS.